United States Patent [19]

Heinz

[11] Patent Number: 5,395,245
[45] Date of Patent: Mar. 7, 1995

[54] ELASTIC PATTERN ABACUS AND TOOL FOR CHANGING ARRANGEMENT OF ABACUS BEADS

[76] Inventor: Ted Heinz, 33694 Colgate Dr., Union City, Calif. 94587

[21] Appl. No.: 147,641

[22] Filed: Nov. 4, 1993

[51] Int. Cl.$^6$ .................................. G06C 1/00
[52] U.S. Cl. ................................ 434/204; 223/48; 434/207; 434/203
[58] Field of Search .............. 434/203, 204, 207; 446/227, 486, 490, 119; 63/2, 3, 5.1, 11, DIG. 3; 223/48, 99, 102

[56] References Cited

U.S. PATENT DOCUMENTS

| | | | |
|---|---|---|---|
| 386,723 | 7/1888 | Smith | 223/102 |
| 1,293,660 | 2/1919 | Armstrong | 223/102 |
| 2,330,538 | 9/1943 | Allen | 446/227 |
| 2,529,059 | 11/1950 | Tell | 223/48 |
| 2,585,781 | 2/1952 | Johnson | 446/99 |
| 3,811,205 | 5/1974 | Pitzler | 434/203 |
| 4,210,093 | 7/1980 | Baker | 434/203 X |
| 4,274,565 | 6/1981 | Russell | 223/102 |
| 4,351,166 | 9/1982 | Belin | 63/5.1 X |

*Primary Examiner*—Gene Mancene
*Assistant Examiner*—Jeffrey A. Smith

[57] ABSTRACT

The elastic pattern abacus relates to educational counting devices for learning basic number and arithmetic concepts. The present invention introduces a new flexible medium for threading and holding counters (beads or blocks of any shapes) in a sequence, such that: they slide easily, yet are automatically held stably at any desired positions along the sequence. The members of the abacus can be separated, counted, grouped, divided, and regrouped to demonstrate arithmetic concepts and number systems. A tool for changing the arrangement of the abacus beads is also disclosed.

7 Claims, 4 Drawing Sheets

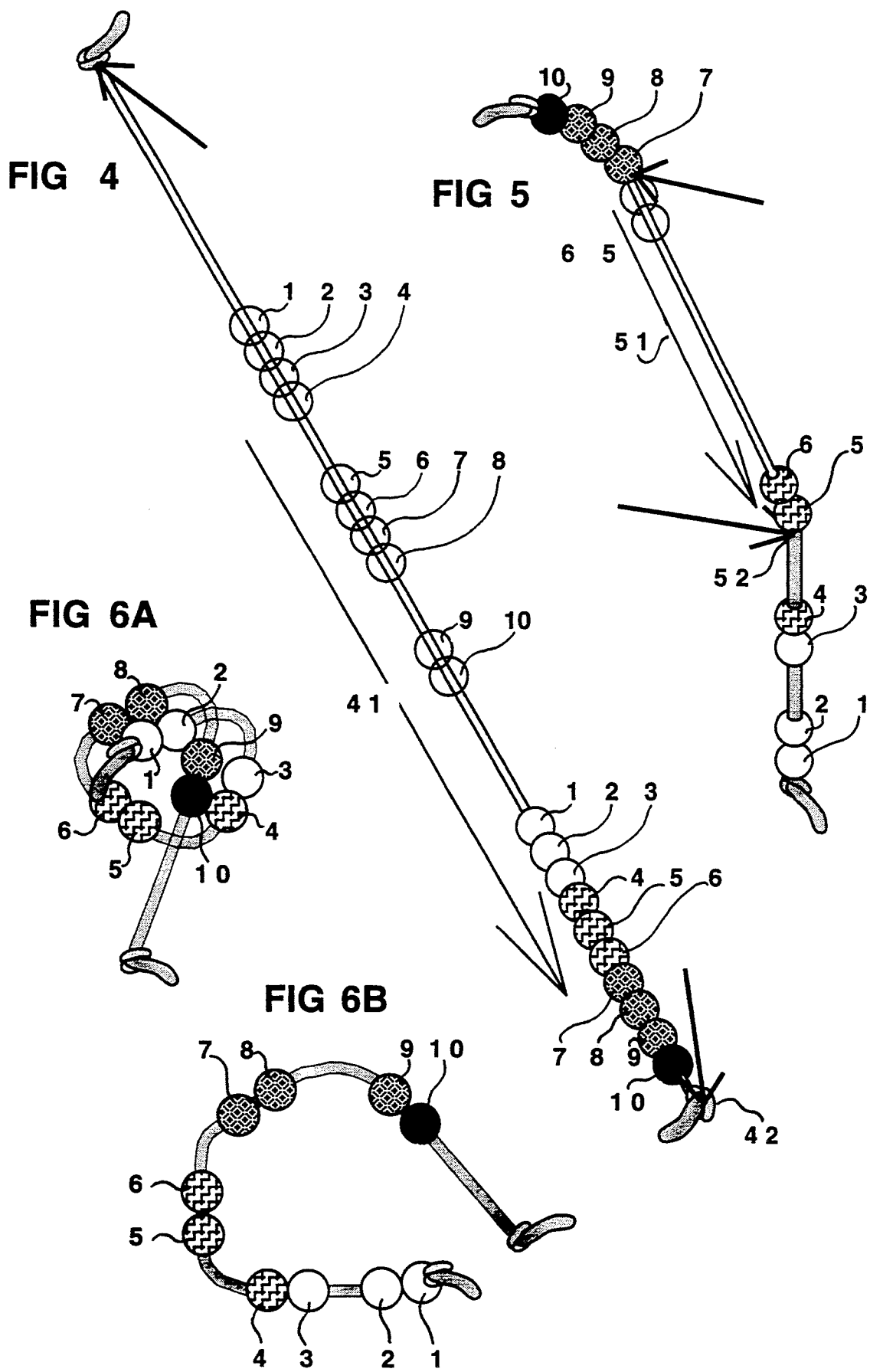

ELASTIC PATTERN ABACUS AND TOOL FOR CHANGING ARRANGEMENT OF ABACUS BEADS

BACKGROUND OF INVENTION

The present invention relates to educational counting materials and devices for learning basic number and arithmetic concepts. The present invention introduces a new flexible medium for threading and holding counters (beads or blocks of any shapes) in a sequence, such that: they slide easily, yet are automatically held stably at any desired positions along the sequence. The user can separate, count, group, divide, and regroup the pieces.

DISCUSSION OF PRIOR ART

There are existent many types of counting and computational manipulatives: Often teachers use collections of whatever common objects are most available (beans, bottle caps, etc.). As well, there are counters which snap together or in some other way facilitate grouping for organizing and visualizing certain number concepts. It is a common practice to use beads threaded on a cord or string for teaching basic number concepts, patterns and other complimentary educational goals. And, as well, there are many educational abacus-like counting devices. None, however, affords the unique flexibility and convenience of the present invention.

Prior art U.S. Pat. No. 4,884,973 PAK: An aid for teaching addition and subtraction: rings slidable on a horizontal rod. Counters grouped to represent equations displayed on changeable cards. Differs from present invention in that it uses a fixed ridged horizontal rod of a length appropriate mainly for addition facts and a limited number of counters.

Prior art U.S. Pat. No. 4,993,952 YEH: An aid for teaching addition and subtraction: numbered beads on a horizontal rod. Selected number of beads are separated from the remaining beads. Differs from present invention in that it uses a fixed ridged horizontal rod of a length appropriate mainly for addition facts and a limited number of counters.

OBJECTIVES OF THE INVENTION

One objective of the present invention is to provide an educational resource: a manipulative which serves to develop basic number and arithmetic concepts and skills; a stable, self evident preestablished structure with a certain amount of internal flexibility and open-endedness.

In general terms, students will develop their sense of number. More specifically: they will develop an understanding of numeration systems (decimal or other) and computational operations (addition, subtraction, multiplication, division) by physically manipulating: counting, grouping, separating, regrouping, detecting patterns, etc.

Manipulative Objectives and Advantages

It is an object of this invention to provide a means for holding sets of counters in numeration sequence patterns such that the counters can be organized (grouped and separated) with simple and easy movements along the sequence, yet, not become accidentally disorganized, nor separated and lost, even though unconcernedly handled (moved, dropped, stored, etc). Sets can be stored effortlessly and compactly, and, when opened up and extended for use, adapted to whatever space is available to the learner. These characteristics will provide much greater efficiency, flexibility, and general usability than other counting materials presently available.

DESCRIPTION OF THE INVENTION

Physical Characteristics

Beads are threaded on an elastic cord which, in its relaxed state, has a cross section slightly larger than the diameter of the holes in the beads. Friction holds the beads in any position unless concertedly pushed along the cord to any other desired position in relationship to other beads.

However, if the cord is stretched, its diameter is correspondingly reduced allowing the beads to slide freely; thus if the cord is inclined toward a vertical position the beads slide to whatever stop is placed along the way. This technique is used to either separate into a series of groups, or to bring back together a series that has been separated. (Normally fingers are used to stop the beads at a desired position.)

In preferred embodiments the cord is of a rubber or rubber like material. Cross sections of the cord may be of any shape, solid or hollow (such as surgical tubing). It is necessary to find a balance in the characteristics of the cord material (shape, strength, softness, elasticity) and the ratio between cord size to opening in the beads, in order to achieve the most satisfactory ease of manipulation, stability and durability.

Depending on educational applications the beads may vary in size and inside diameters. The bead material may also vary. Wood and plastic have been found to be quite satisfactory in preferred embodiments.

With most cord, threading must be done either, by trimming an end of the cord to form a point (or smaller portion) which can be threaded through the opening in the bead, or by using some sort of threading device.

A wire loop can be formed in such a way that it becomes much like a needle. This works well obviously with great advantage, for many beads can easily be threaded and organized on the wire before the beads are forced over the doubled end of the cord and onto the rest of the cord.

Another threading device is a rod with a split, barbed end into which the cord end is placed. It closes over the cord end holding it as the beads are threaded over it from the rod onto the cord.

With some cord designs, even though the overall diameter is greater than the hole in the bead, the cord may be threaded directly. This is possible because profile appendages around a smaller diameter solid core collapse inward as the cord is pushed into the hole yet provide enough out ward pressure to hold each bead in place. Similarly the wider dimension of a rectangular shaped profile will pressure against the walls as the cord is pushed into the hole.

Hole design may also be varied from the standard round hole in order to allow cord or tubing (hollow tubing works best) to be flattened as it is pushed into the hole while it continues to provide enough outward pressure against the narrower portion of the interior of the hole providing friction to hold each bead stably in place.

Pedagogical Characteristics

Working with concrete manipulative materials, a student's understanding of numerical concepts and operations are soundly developed. A teacher may direct students with questions which guide students to observe such attributes as constancy and change in numbers and patterns. Such manipulative experience of these elements helps children develop motor skills, physical perception and ultimately a strong sense of number.

Sets are usually pre-established with certain patterns of colors or shapes in sequences and generally are used to highlight numerical concepts such as base 10. A set may contain any number of beads, depending on the level of the student and the learning goals: commonly 20, 100, 144, as well as other intermediate numbers. Once a set has been established the amount and the order of the beads remain constant for use by students.

A student works with multiple revisable number patterns he forms within these preestablished patterns. By grouping the beads in certain amounts along the sequence, number patterns can be explored, and arithmetic operations may be represented and solved, thus developing, through multi-sensory experience, a strong number sense.

Other uses are:

a) Simple three dimensional symbolic figures can be made, much like clowns do with long balloons to form animals and other figures for children. The series of beads can be doubled back and crossed over at different points along its sequence, binding at the cross points to make loops and appendages thus forming body parts or portions of the figure to be represented. In a like manner: separate sets can be combined in order to make more sophisticated combinations and figures.

b) Can be used as finger play to disperse and relax nervous tension or to motivate small muscle exercise for individuals (such as arthritic patients) needing physically therapy in fingers.

c) The use of elastic threaded through an opening slightly smaller than its thickness may have applications where temporary and slight friction is needed for holding objects or pieces against gravity at changeable positions and heights. For example: Venetian like window blind slats (threaded through slot openings on two vertically oriented elastic cords) may be individually adjusted to various heights and positions.

d) Jewelry may be threaded on elastic using means for threading elastic provided for in this invention.

SHORT DESCRIPTION OF THE DRAWINGS

FIG. 4 is an illustration of beads sliding to lower end when cord is stretched in vertical tending (slanted) position and arrows at pressure points on cord.

FIG. 5 is an illustration of beads sliding on stretched slanted cord and grouped in twos at selected pressure point on cord.

FIG. 6a is an illustration of beads and cord bunched together in haphazard fashion.

FIG. 6b is an illustration of beads and cord in relaxed semi-circle position.

DESCRIPTION OF THE PREFERRED EMBODIMENTS

FIG. 1 through 6 represent only one of many possible embodiments: 10 round beads 1-10 in a pattern using 4 shades (or colors) on a solid round elastic cord 11. Elastic cord 11 has knots 12A and 12B at its ends to prevent beads 1-10 from being pushed off cord 11.

Depending on educational applications the beads may vary in size and inside diameters. The bead material may also vary. Wood and plastic have been found to be quite satisfactory in preferred embodiments.

Though cord cross sections may be solid or hollow (such as surgical tubing), and of any shape, here the cross section is round and solid. In preferred embodiments the cord is made of any of several elastic materials which have qualities of softness, stretchability, strength, etc. similar to material found in rubber bands.

It is necessary to find a balance in the characteristics of the cord material (shape, strength, softness, elasticity) and the ratio between cord size to opening in the beads in order to achieve the most satisfactory ease of manipulation, stability and durability.

Figure 1:
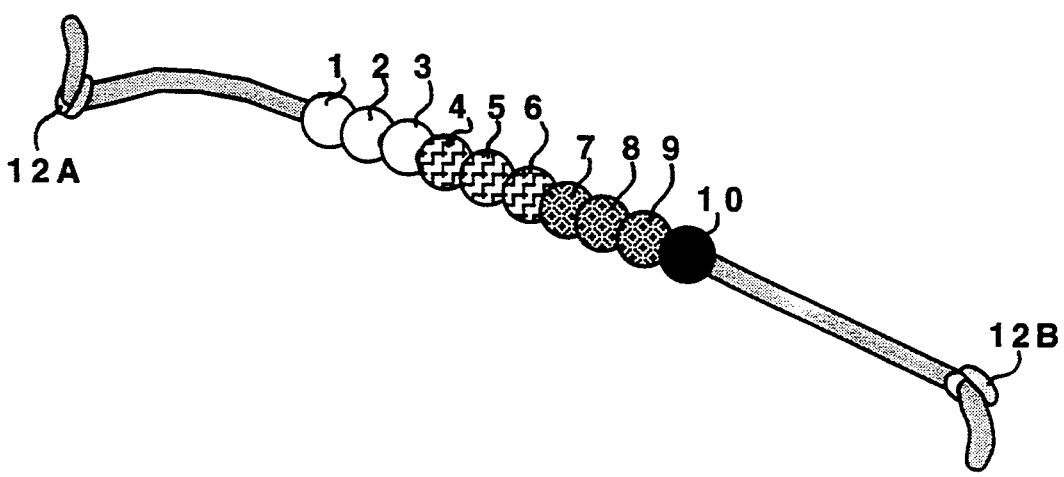
FIG. 1 is an illustration of round beads threaded on an extended and relaxed round elastic cord in a pattern of 4 shades (or colors) in 3 groups of three plus one.

FIG. 1 shows 10 round beads 1-10 representing a short number line in a pattern of 3 groups of three 3, 6, 9 plus one 10. This particular pattern would be used as a sequential number line starting with the first white one 1. (Some patterns use either end as beginning points for counting.)

As students advance in number concepts and skills, other groups of ten of the same pattern would be added to the sequence.

Knots or other means for preventing the removal of the beads from the cord may be used.

FIGS. 2-6 represent the main manipulative attributes and procedures which make this invention so useful and unique.

Figure 2A:
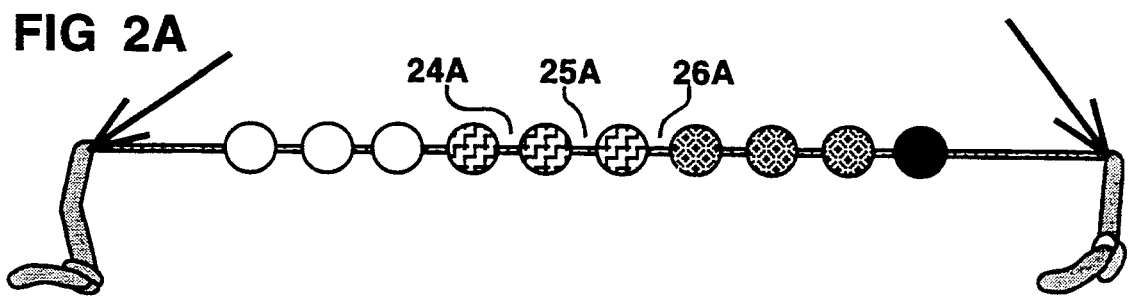
FIG. 2a is an illustration of beads separated with equal spaces between each on an horizontally stretched cord and arrows at pressure points on cord.
Figure 2B:
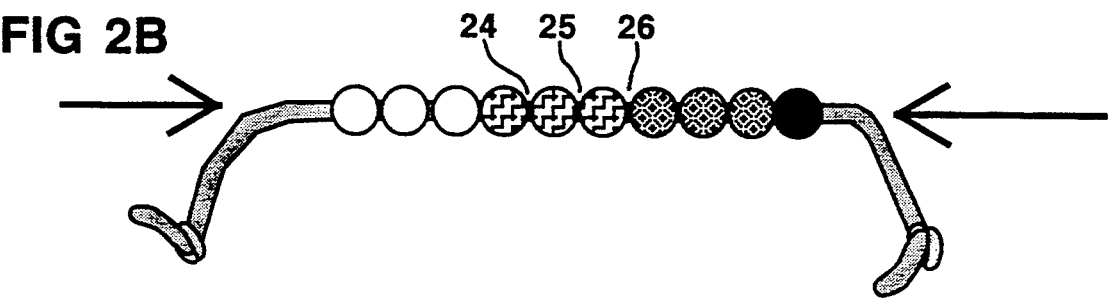
FIG. 2b is an illustration of beads returning to original positions touching one another in sequence when cord is relaxed.

FIGS. 2a and 2b show how the beads separate with equal spaces between each 24a, 25a, 26a on a horizontally stretched cord 11a and how the beads return to original positions touching one another 24, 25, 26 when the cord 11 is relaxed. This action of transforming by lateral stretching and relaxing of the cord is a multi-sensory activity which is likely to be repeated over and over as a student observes the change and constancy involved, at the same time, enjoying a sense of muscular control, the subtle sounds, vibrations, etc. A teacher may direct and challenge students to perform and observe a variety of details in this seemingly simple activity.

Figure 3:
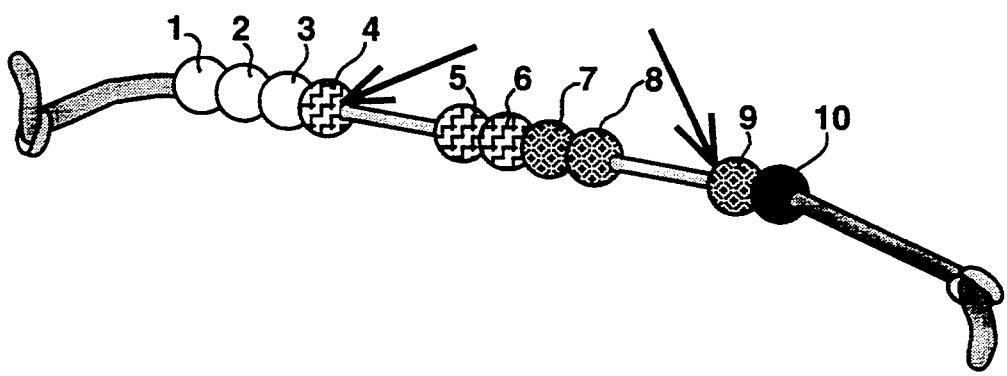
FIG. 3 is an illustration of beads separated and grouped by pushing along cord and arrows indicating pressure points on beads.

FIG. 3 shows beads separated and grouped 1–4, 5–8, 9, 10 by pushing beads 4,9 along cord. A student works with multiple revisable number patterns he forms within the preestablished sequence patterns. By grouping the beads in certain amounts along the sequence, number patterns can be explored, and arithmetic operations may be represented and solved, thus developing, through multi-sensory experience, a strong number sense. The beads are relocated with ease and, even though the cord is totally flexible, the beads remain stably at the chosen locations.

FIG. 4 shows beads 1–10 sliding 41 to lower end 42 when cord is stretched in vertical tending position. This action of transforming by stretching and inclining the cord is a pleasing action: It is an instantaneous remaking of a pattern undone; it reaffirms the conservation of a pattern whose perception may have been lost when separated into other groupings; there is muscular control, subtle sensations in the movement of colors, the sounds, vibrations. Regrouping to the original compact number line sequence is easy, fast and fun.

FIG. 5 shows a group of 2 beads 5, 6 sliding 51 to a selected pressure point 52 to fit into the pattern of twos 1, 2 and 3, 4; etc. Fingers are normally used to hold the beads 10, 9, 8, 7 just beyond and above the selected pair 6, 5 and to stop the beads 6, 5 at a desired position (52). Using this method to form a pattern of groups, such as this pattern of twos 1, 2; 3, 4; 5, 6; etc., involves a pleasing repetitive action which is useful in developing fine muscle coordination in a rhythmic sequence of movements involving arms and fingers. This is an efficient, effective means for exploring patterns by groupings within whatever basic pattern has been preestablished (such as base 10). Obviously, multiplication and division concepts will be developed using this technique applied to forming a sequence of equal groups.

FIGS. 6a and 6b show how beads 1–10 and cord 60 bunched together in haphazard fashion (FIG. 6a) can easily open up to a relaxed semi-circle position (FIG. 6b). The elastic has a strong tendency to not tangle as ordinary string or cord will. This quality allows for ease of handling and storage, as well as offering experience in conservation of number and sequence. What appears at first to be disorganized and chaotic (FIG. 6a) still contains an orderly sequence which can easily be retrieved (FIG. 6b).

FIGS. 7–11 deal with means for threading elastic cord into openings of a diameter smaller than that of the cord. With most such cord, threading must be done, either, with a smaller end portion (which can be achieved by trimming or molding an end of the cord to form a point) which can be threaded through the opening in the bead, or, by using some sort of threading device.

Figure 7:
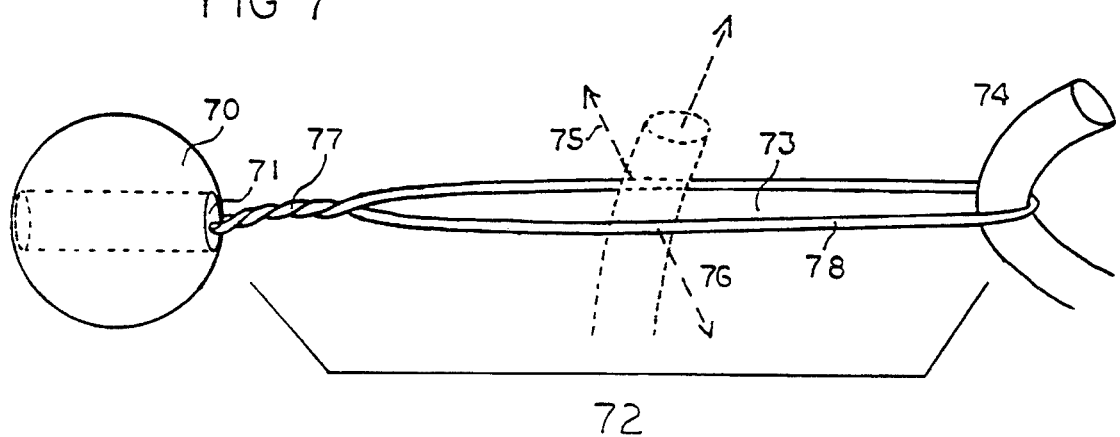
FIG. 7 is an illustration of a bead with a hole for threading, a threading device with a flexible eye and a cord inserted through eye.

FIG. 7 shows bead 70 with a hole 71 for threading, a threading device 72 with a flexible eye 73 and a cord 74 inserted through eye 73. Arrows 75, 76 show how eye 73 can widen to allow cord 74 to be threaded into eye 73. This threading device 72 is similar to a needle but can be any length. Ordinarily it is made of a wire loop twisted at one end 77 forming the "point" and the entire rest of the loop 78 narrowed or flattened such that it threads easily through the openings 71 in the beads 70. This works well, obviously with great advantage, for many beads can easily be threaded and organized on the wire before the beads are forced over the doubled end of the cord and onto the rest of the cord.

Figure 8A:
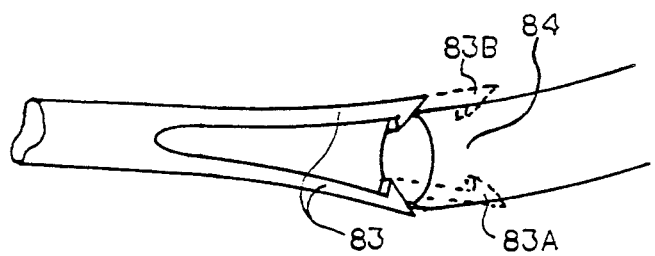
FIG. 8a shows detail of the split end of threading device and cord end before forcing into the "jaws" of the split end.

FIG. 8a shows detail of split end 83 of threading device 82 and cord end 84 being forcing into the "jaws" of the split end 83. These "jaws" 83 are somewhat flexible allowing it to be pushed onto cord 84 as they open. As the cord end 84 slides into the "jaws" 83, the barbs 83a, 83b tend to dig in.

Figure 8B:
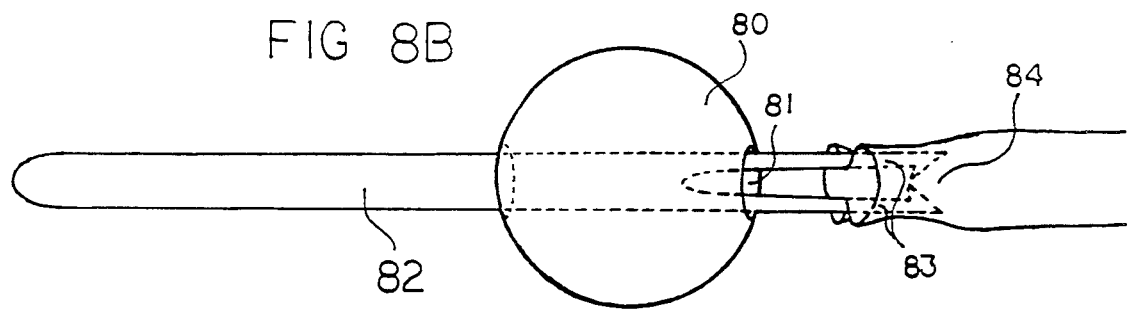
FIG. 8b is an illustration of a bead with a hole for threading on a threading device with a barbed split end which is pressured into and holding the end of an elastic cord.

FIG. 8b shows the "jaws" 83 holding the cord end 84 as a bead 80 having a hole 81 is threaded from the threading device 82, over the split end 83, onto the cord 84. This threading device 82 could be relatively long for organizing a set of beads before threading onto cord.

FIGS. 9–11 show profiles of cords and openings that allow the broader elastic to collapse or fold inward to conform to the size of the opening as the cord is threaded into the hole. With some cord designs, even though the overall diameter is greater than the hole in the bead, the cord may be threaded directly. This is possible because the profile collapses inward as the cord is pushed into the hole yet provides enough outward pressure to hold each bead in place.

Figure 9A:
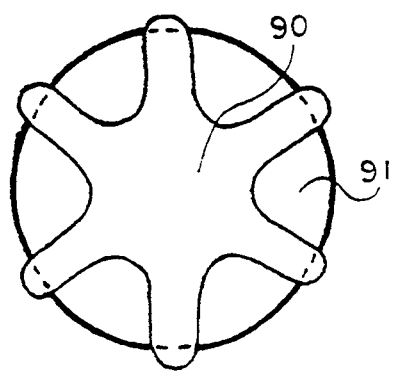
FIG. 9a is an illustration of a "star" cord profile contrasted in front of a threading hole.
Figure 9B:
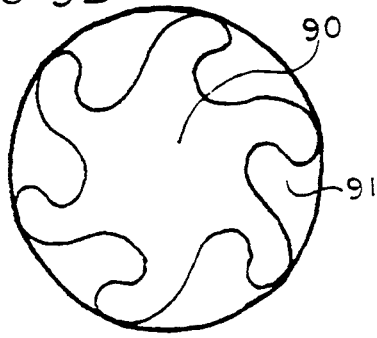
FIG. 9b is an illustration of a "star" cord profile inside a threading hole.

FIGS. 9a and 9b show a star cord profile 90 contrasted in front (FIG. 9a) and inside (FIG. 9b) a threading hole 91. There are an unlimited number of cross-sectional designs which would conform to this same concept: profile appendages around a smaller diameter core collapse inward as the cord is pushed into the hole, yet provide enough out ward pressure to hold each bead in place.

Figure 10A:
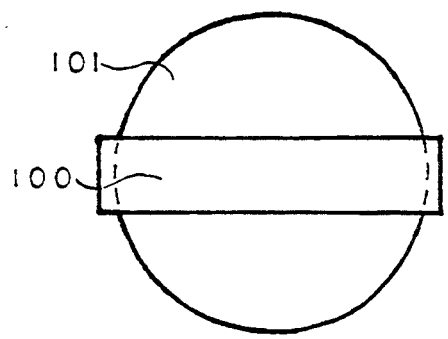
FIG. 10a is an illustration of a rectangle cord profile contrasted in front of a threading hole.
Figure 10B:
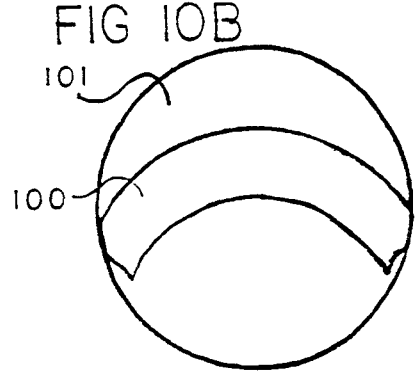
FIG. 10b is an illustration of a rectangle cord profile inside a threading hole.

Similarly the wider dimension of rectangular or oblong shaped profiles will pressure against the walls as the cord is pushed into the hole. FIGS. 10a and 10b show a rectangle cord profile 100 contrasted in front (FIG. 10a) and inside (FIG. 10b) a threading hole 101.

Figure 11A:
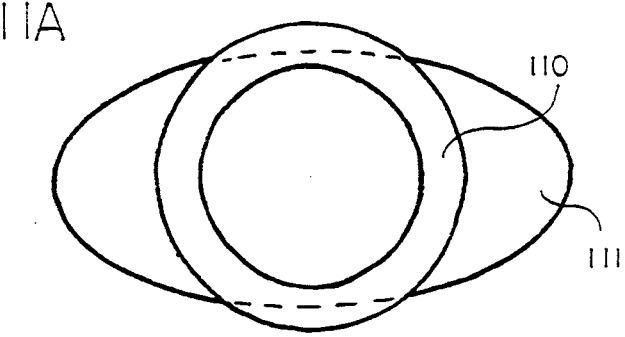
FIG. 11a is an illustration of a round tubular cord profile contrasted in front of an oval threading hole.
Figure 11B:
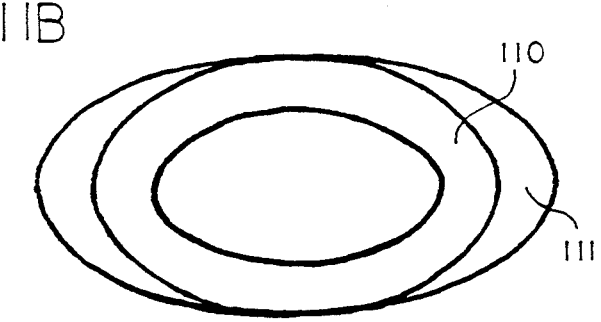
FIG. 11b is an illustration of a round tubular cord profile flattened inside an oval opening.

Hole design may also be varied from the standard round hole in order to allow cord or tubing (hollow works best) to be flattened as it is pushed into the hole while still providing enough pressure against the narrower portion of the hole to hold each bead stably in place. FIGS. 11a and 11b show a round tubular profile 110 contrasted in front of (FIG. 11a) and inside (FIG. 11b) an oval threading hole 111. There are an any number of opening designs which would conform to this same concept: any opening with a wider portion that provides space for unrestrained widening while pressuring against the walls of the narrower portion.

What I claim is:

1. An abacus for studying numbers systems through sequential patterns comprising a plurality of beads each having a central opening; a stretchable elastic cord having free ends and being fed through the openings of said beads, said beads occupying a space on said cord, said cord when without tension having a diameter larger than each said opening of said beads, and having a diameter smaller than each said opening when said cord is stretched, thereby providing controlled movability to each of said beads;

said beads having different colors; said cord having a length exceding said space occupied by said beads by a free space;

said free space providing for arranging groups of said beads separated by spaces, said groups of said beads representing arithmetic amounts.

2. An abacus for studying numbers systems through sequential patterns, comprising a plurality of beads each having a central opening; a stretchable elastic cord having free ends and being fed through the openings of said beads, said beads occupying a space on said cord, said cord when without tension having a diameter larger than each said opening of said beads, and having a diameter smaller than each said opening when said cord is stretched, thereby providing controlled movability to each of said beads;

said beads having different colors; wherein said elastic cord is hollow.

3. An abacus for studying numbers systems through sequential patterns comprising a plurality of beads each having a central opening; a stretchable elastic cord fed through the openings of said beads, said beads occupying a space on said cord, said cord when without tension having a diameter larger than each said opening of said beads, and having a diameter smaller than each said opening when said cord is stretched, thereby providing controlled movability to each of said beads;

said beads having different colors; wherein said elastic cord includes a center core and at least one rib extending radially from said core.

4. An abacus for studying numbers systems through sequential patterns comprising a plurality of beads each having a central opening; a stretchable elastic cord having free ends and being fed through the openings of said beads, said beads occupying a space on said cord, said cord when without tension having a diameter larger than each said opening of said beads, and having a diameter smaller than each said opening when said cord is stretched, thereby providing controlled movability to each of said beads;

said beads having different colors;

wherein said elastic cord has a rectangular cross-section with a width exceeding the diameter of said openings in said beads.

5. An abacus for studying numbers systems through sequential patterns comprising a plurality of beads each having a central opening; a stretchable elastic cord having free end and being fed through the openings of said beads, said beads occupying a space on said cord, said cord when without tension having a diameter larger than each said opening of said beads, and having a diameter smaller than each said opening when said cord is stretched, thereby providing controlled movability to each of said beads; said beads having different colors; wherein said openings in said beads have a greater width than height.

6. An abacus for working in different number systems, said abacus comprising a plurality of beads of different colors, each bead having a central opening, said plurality of beads arranged in repetitive patterns each including as many beads as there are units in a selected number system;

an elastic cord fed through the openings of said beads, said cord when without tension having a diameter larger than each said opening of said beads, and allowing to move said beads along said cord when said cord is stretched.

7. An abacus for working in different number systems, and a tool for changing the arrangement of abacus beads, said abacus comprising a plurality of beads of different colors, each of said beads having a central opening, said plurality of beads being arranged according to the purposes of the user; an elastic cord having free ends and being fed through the openings of said beads;

said cord when without tension having a diameter larger than each said opening of said beads, and allowing to move said beads when said cord is stretched;

said tool for changing comprising a needle having an outer diameter smaller than said holes in said beads, a pointed end, and a cord grabbing end, said cord grabbing end being two prongs barbed towards each other, said barbed prongs holding said cord during threading operation.

* * * * *